United States Patent
Nakano et al.

(10) Patent No.: US 10,378,641 B2
(45) Date of Patent: Aug. 13, 2019

(54) POWER SYSTEM

(71) Applicant: HONDA MOTOR CO., LTD., Tokyo (JP)

(72) Inventors: Yoshihiro Nakano, Saitama (JP); Megumi Maruyama, Saitama (JP); Jun Ohmura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 15/824,137

(22) Filed: Nov. 28, 2017

(65) Prior Publication Data

US 2018/0172138 A1    Jun. 21, 2018

(30) Foreign Application Priority Data

Dec. 20, 2016   (JP) .................................. 2016-247096

(51) Int. Cl.
*F16H 57/021*   (2012.01)
*F16H 57/04*    (2010.01)
(Continued)

(52) U.S. Cl.
CPC ........... *F16H 57/0424* (2013.01); *B60K 1/00* (2013.01); *F16H 1/20* (2013.01); *F16H 37/0813* (2013.01);
(Continued)

(58) Field of Classification Search
CPC .............. F16H 57/0424; F16H 57/0457; F16H 57/021; F16H 57/037; F16H 37/0813;
(Continued)

(56) References Cited

U.S. PATENT DOCUMENTS

2003/0196842 A1*  10/2003  Hashimoto .............. B60K 1/00
                                                        180/65.1
2005/0143210 A1    6/2005  Hamai et al.

FOREIGN PATENT DOCUMENTS

JP         2002-104001 A       4/2002
JP         2003-312282 A      11/2003
JP         2005-125920 A       5/2005

OTHER PUBLICATIONS

May 22, 2018, Japanese Office Action issued for related JP application No. 2016-247096, (2 pages).

* cited by examiner

*Primary Examiner* — Mark J Beauchaine
(74) *Attorney, Agent, or Firm* — Paratus Law Group, PLLC

(57) ABSTRACT

A power system includes: an electric motor that drives wheels of a vehicle; a transmission that is disposed on power transmission paths between the electric motor and the wheels; and a differential gear system that distributes output power shifted by the transmission to the wheels. The transmission includes: a first gear mechanically connected to the electric motor; a second gear that has a rotation axis in common with the first gear and is mechanically connected to a differential gear casing of the differential gear system; a pinion gear that meshes with the first gear and the second gear; and a pinion holder that rotatably supports the pillion gear. The pinion holder has a pinion gear supporting portion which is disposed on a side of the differential gear casing to support the pinion gear, relative to a meshing portion between the second gear and the pinion gear.

12 Claims, 6 Drawing Sheets

(51) Int. Cl.
*F16H 37/08* (2006.01)
*F16H 1/20* (2006.01)
*F16H 48/40* (2012.01)
*F16H 57/037* (2012.01)
*F16H 57/08* (2006.01)
*B60K 1/00* (2006.01)
*F16H 57/02* (2012.01)
*F16H 48/08* (2006.01)

(52) U.S. Cl.
CPC ........... *F16H 48/40* (2013.01); *F16H 57/037* (2013.01); *F16H 57/082* (2013.01); *B60K 2001/001* (2013.01); *B60Y 2306/03* (2013.01); *B60Y 2410/10* (2013.01); *F16H 48/08* (2013.01); *F16H 57/021* (2013.01); *F16H 57/045* (2013.01); *F16H 57/0423* (2013.01); *F16H 57/0457* (2013.01); *F16H 57/0471* (2013.01); *F16H 57/0476* (2013.01); *F16H 57/0479* (2013.01); *F16H 57/0483* (2013.01); *F16H 2057/0216* (2013.01); *F16H 2057/02034* (2013.01)

(58) Field of Classification Search
CPC .. F16H 1/20; F16H 2057/02034; F16H 48/40; F16H 48/08
See application file for complete search history.

US 10,378,641 B2

POWER SYSTEM

CROSS-REFERENCE TO RELATED APPLICATION (S)

This application claims priority from Japanese Patent Application No. 2016-247096 filed on Dec. 20, 2016, the entire contents of which are incorporated herein by reference.

FIELD

The present invention relates to a power system that is provided in an electric motor vehicle.

BACKGROUND

A power system is disclosed in JP-A-2002-104001 which includes an electric motor for driving a left wheel and a right wheel of a vehicle, a transmission that is disposed on power transmission paths between the electric motor and the left wheel and between the electric motor and the right wheel, and a differential gear system that distributes output power shifted by the transmission to the left wheel and the right wheel. This type of the power system is provided in an electric motor vehicle such as a hybrid vehicle or an electric vehicle, as a front wheel drive system r a rear wheel drive system, and it is important for appropriate power transmission how to support gears constituting the transmission.

However, no specific description is given in JP-A-2002-104001 with respect to the support of the gears constituting the transmission.

SUMMARY

The invention is to provide a power system in which a pinion holder for holding a pinion gear is appropriately disposed to realize appropriate power transmission.

The invention provides following aspects (1) to (12).

(1) A power system (e.g., a power system 1 in an embodiment) including:
an electric motor (e.g., an electric motor 2 in an embodiment) that drives a left wheel and a right wheel of a vehicle;
a transmission (e.g., a transmission 5 in an embodiment) that is disposed on power transmission paths between the electric motor and the left wheel and between the electric motor and the right wheel; and
a differential gear system (e.g., a differential gear system 6 in an embodiment) that distributes output power shifted by the transmission to the left wheel and the right wheel,
wherein
the transmission includes:
a first gear (e.g., a first gear 51 in an embodiment) that is mechanically connected to the electric motor;
a second gear (e.g., a second gear 52 in an embodiment) that has a rotation axis in common with the first gear and is mechanically connected to a differential gear casing (e.g., a differential gear casing 61 in an embodiment) of the differential gear system;
a pinion gear (e.g., a pinion gear 53 in an embodiment) that meshes with the first gear and the second gear; and
a pinion holder (e.g., a pinion holder 54 in an embodiment) that rotatably supports the pinion gear, and
the pinion holder has a pinion gear supporting portion (e.g., a pinion gear supporting portion 54a in an embodiment) which is disposed on a side of the differential gear casing of the differential gear system to support the pinion gear, relative to a meshing portion (e.g., a meshing portion M in an embodiment) between the second gear and the pinion gear.

(2) The power system according to aspect 1), wherein
the pinion gear is configured such that one end of a pinion shall (e.g., a pinion shaft 53c in an embodiment) is rotatably supported on a partition wall portion (e.g., a partition wall 43 in an embodiment) through a first bearing (e.g., a bearing 55 in an embodiment) and an other end thereof is rotatably supported on the pinion gear supporting portion of the pinion holder through a second bearing (e.g., a bearing 56 in an embodiment), and
the pinion holder is fixed to the partition wall portion.

(3) The power system according to aspect (1) or (2), wherein
the pinion gear includes a large diameter gear (e.g., a large diameter gear 53a in an embodiment) and a small diameter gear (e.g., a small diameter gear 53b in an embodiment), and
the small diameter gear meshes with the second gear.

(4) The power system according to any one of aspects (1) to (3), wherein
the power system includes a housing (e.g., a housing 4 in an embodiment) that accommodates the electric motor, the transmission, and the differential gear system,
the housing has a storage portion (e.g., a storage portion 44 in an embodiment) that stores a liquid medium, and
the pinion holder has a storage space (e.g., a space portion S in an embodiment) that stores the liquid medium splashed by a rotating body (e.g., the second gear 52 or the pinion gear 53 in an embodiment).

(5) The power system according to aspect (4), wherein
the rotating body is the second gear.

(6) The power system according to aspect (4) or (5), wherein
the power system includes a plurality of the pinion gears, and
the rotating body is at least one of the plurality of pinion gears.

(7) The power system according to any one of aspects (4) to (6), wherein
the pinion holder has a cup portion (e.g., a cup portion 54c in an embodiment) that is formed with a through-hole (e.g., a through-hole 54e in an embodiment), through which one axle of a left axle (e.g., an axle 3A in an embodiment) and a right axle (e.g., an axle 3B in an embodiment) penetrates, on a bottom (e.g., a bottom 54d in an embodiment),
the storage space is a space portion (e.g., the space portion S in an embodiment) that is formed by the cup portion and the one axle, and
the pinion holder has a communication portion (e.g., a communication hole 54f or 54g in an embodiment) communicating with the space portion.

(8) The power system according to aspect (7), wherein
the differential gear casing of the differential gear system is rotatably supported on the cup portion of the pinion holder through a third bearing (e.g., a bearing 65 in an embodiment), and
the third bearing is disposed in the space portion.

(9) The power system according to aspect (7) or (8), wherein
the pinion holder has a first guide portion (e.g., a first guide portion 54i in an embodiment) on a first face (e.g., a first face 54h in an embodiment) opposed to the pinion gear to receive the liquid medium, and
the communication portion is formed in a connecting portion between the first guide portion and the cup portion.

(10) The power system according to any one of aspects (7) to (9), wherein the pinion holder has a second guide portion (e.g., a second guide portion 54k in an embodiment) on a second face (e.g., a second face 54j in an embodiment) opposed to the differential gear casing of the differential gear system to receive the liquid medium, and the communication portion is formed in a connecting portion between the second guide portion and the cup portion.

(11) The power system according to any one of aspects (4) to (10), wherein the differential gear casing of the differential gear system has an input plate (e.g., an input plate 61b in an embodiment) that extends in a radial direction and is mechanically connected to the second gear, and the input plate has a third guide portion (e.g., a third guide portion 61e in an embodiment) that guides the liquid medium supplied from the storage space to the pinion gear supporting portion of the pinion holder.

(12) The power system according to aspect (11), wherein the pinion gear supporting portion of the pinion holder has a pocket (e.g., a pocket 54m in an embodiment) that stores the liquid medium.

According to aspect (1), since the pinion holder has the pinion gear supporting portion, which is disposed on the side of the differential gear casing of the differential gear system to support the pinion gear, relative to the meshing portion between the second gear mechanically connected to the differential gear casing of the differential gear system and the pinion gear, the pinion gear can be appropriately supported. This enables appropriate power transmission from the pinion gear to the second gear.

According to aspect (2), since the pinion holder for supporting the other end of the pinion shaft is fixed to the partition wall portion for supporting one end of the pinion shaft, the partition wall portion has both the support function of the pinion shaft and the support function of the pinion holder, so that the components can be used in common and thus the number of components can be reduced.

According to aspect (3), since the pinion gear has the large diameter gear and the small diameter gear and the small diameter gear meshes with the second gear, enlargement in dimension in the radial direction can be prevented.

According to aspect (4), since the pinion holder has the storage space for storing the liquid medium splashed by the rotating body, the splashed liquid medium is supplied to the portion requiring lubrication through the storage space of the pinion holder, and thus the necessary portion can be lubricated even when there is no oil pump.

According to aspect (5), since the second gear also serves as the rotating body for splashing the liquid medium stored in the storage portion, the number of components can be reduced.

According to aspect (6), since the pinion gear also serves as the rotating body for splashing the liquid medium stored in the storage portion, the number of components can be reduced.

According to aspect (7), since the pinion holder has the communication portions communicating with the storage space formed by the cup portion and one axle, it is possible to guide the liquid medium scattered on the pinion holder to the storage space.

According to aspect (8), since the third bearing for rotatably supporting the differential gear casing of the differential gear system is disposed in the storage space of the pillion holder, the third bearing can be lubricated with the liquid medium stored in the storage space.

According to aspect (9), the liquid medium splashed by the second gear or the pinion gear can be guided from the first guide portion to the storage space through the communication portion.

According to aspect (10), the liquid medium splashed by the second gear or the pinion gear can be guided from the second guide portion to the storage space through the communication portion.

According to aspect (11), the liquid medium is guided from the storage space to the pinion gear supporting portion through the third guide portion of the differential gear casing, and thus the second bearing disposed on the pinion gear supporting portion can be lubricated.

According to aspect (12), the pocket temporality holds the liquid medium supplied to the pinion gear supporting portion, and thus the second bearing disposed on the pinion gear supporting portion can be more properly lubricated.

DETAILED DESCRIPTION

A power system 1 according to an embodiment of the invention will be described with reference to FIGS. 1 to 6.

The power system 1 of the embodiment includes an electric motor 2 that is a drive source for driving axles, and is provided in an electric motor vehicle such as a hybrid vehicle or an electric vehicle as a front wheel drive system or a rear wheel drive system.

Power System

Figure 1:
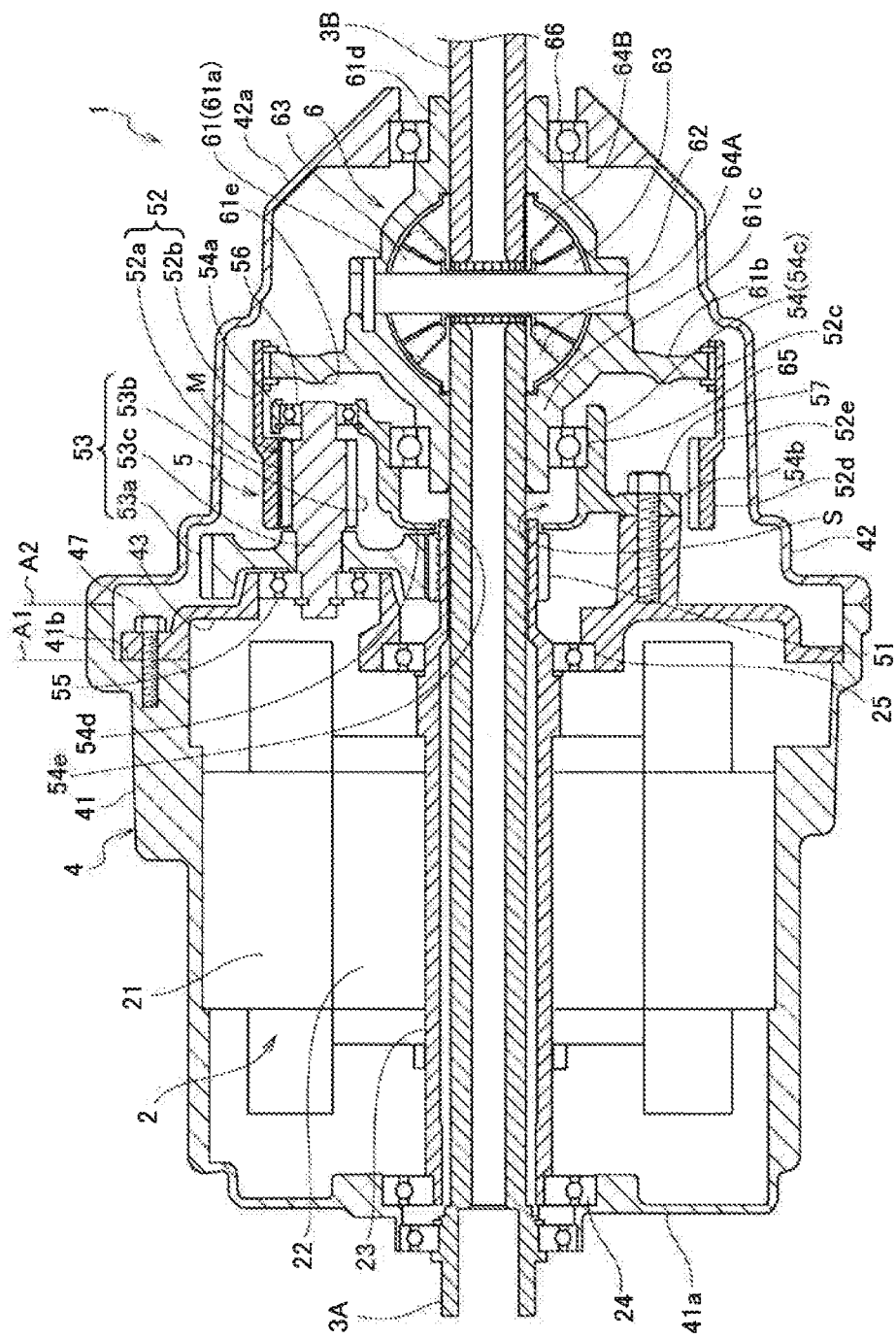
FIG. 1 is a sectional view of a power system according to an embodiment of the invention, and a sectional view taken along line A-A in FIG. 2.

In FIG. 1, reference numerals 3A and 3B indicate left and right axles, which are coaxially disposed in a vehicle width direction. In the power system 1, a housing 4 has the entire shape formed into a substantially cylindrical shape, and includes therein the electric motor 2 for driving the axles, a transmission 5 that decelerates driving rotation of the electric motor 2, and a differential gear system 6 that distributes the driving rotation decelerated by the transmission 5 to the axles 3A and 3B.

Figure 2:
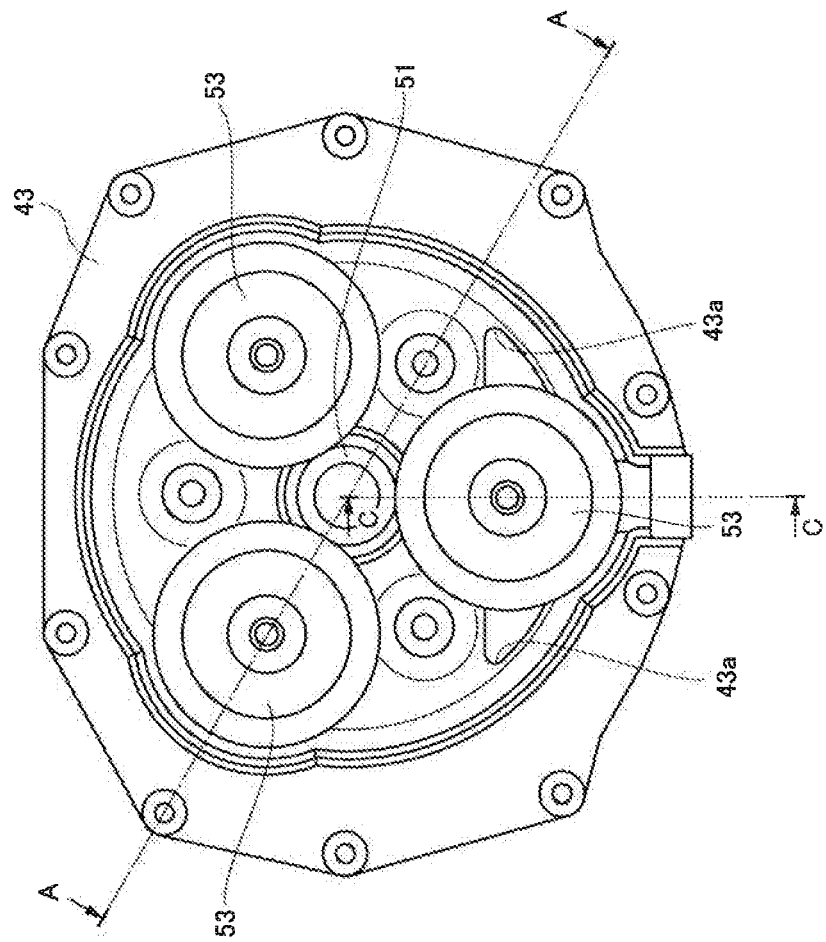
FIG. 2 is a side view of a partition wall and a pinion gear inside the power system when viewed from a differential gear system side.

The housing 4 includes a first casing 41 for accommodating the electric motor 2 and a second casing 42 for accommodating the transmission 5 and the differential gear system 6. A partition wall 43 is provided at a boundary between the first casing 41 and the second casing 42, and an internal space of the first casing 41 is partitioned from an internal space of the second casing 42 by the partition wall 43. The partition wall 43 is fastened to a step portion 41b provided on an outer peripheral part of the first casing 41 with a bolt 47. Therefore, a mating surface A1 of the first casing 41 and the partition wall 43 is located closer to the first casing 41 relative to a mating surface A2 of the first casing 41 and the second casing 42. A bottom of the housing 4 functions as a storage portion 44 for storing lubricating oil (liquid medium), and the lubricating oil is stored up to a stationary oil level L illustrated in FIG. 6. The stationary oil level L is set lower than an air gap G of the electric motor 2 (a clearance secured between an inner periphery of a stator 21 and an outer periphery of a rotor 22 to be described below) so as to reduce an agitation loss of the lubricating oil in the electric motor 2. As also illustrated in FIG. 2, a communication port 43a is formed in a lower part of the partition wall 43 to allow the lubricating oil to flow therethrough.

Electric Motor

The electric motor 2 includes the stator 21 fixed to an inner peripheral part of the first casing 41 and the rotor 22 disposed rotatably on the inner periphery of the stator 21. A rotor shaft 23 is coupled to an inner peripheral part of the rotor 22 so as to surround an outer periphery of one axle 3A, and the rotor shaft 23 is supported on an end wall 41a of the first casing 41 and the partition wall 43 through bearings 24 and 25 so as to be relatively rotable coaxially with the axle 3A. In addition, one end of the axle 3A and the rotor shaft 23 penetrates the partition wall 43 and extends into the second casing 42, and the other end of the axle 3A penetrates the end wall 41a of the first casing 41 and extends to the outside of the housing 4.

Transmission

The transmission 5 includes a first gear 51 mechanically connected to the electric motor 2, a second gear 52 having the same rotation axis as that of the first gear 51 and mechanically connected to a differential gear casing 61 of the differential gear system 6, a plurality of pinion gears 53 meshing with the first gear 51 and the second gear 52, and a pinion holder 54 for supporting the plurality of pinion gears 53 to be rotatable and not to revolve, and the decelerated driving rotation is output to the differential gear casing 61 of the differential gear system 6 through the pinion gear 53 and the second gear 52 when the driving rotation of the electric motor 2 is input from the first gear 51.

The first gear 51 is an external gear, and is formed integrally with the rotor shaft 23. The pinion gear 53 includes a large diameter gear 53a which is an external gear, a small diameter gear 53b which is an external gear, and an pinion shaft 53c which supports the large diameter gear 53a and the small diameter gear 53b in an integrally rotatable manner. The large diameter gear 53a is coupled to the pinion shaft 53c on a side of the electric motor 2, and meshes with the first gear 51. In addition, the small diameter gear 53b is formed integrally with the pinion shaft 53c on a side of the differential gear system 6, and meshes with the second gear 52. An end of the pinion shaft 53c on the side of the electric motor 2 is rotatably supported on the partition wall 43 through the bearing 55, and an end thereof on the side of the differential gear system 6 is rotatably supported on a pinion gear supporting portion 54a of the pinion holder 54 through the bearing 56.

As illustrated in FIG. 2, the transmission 5 of the embodiment includes three pinion gears 53. The three pinion gears 53 are disposed at equal intervals (intervals of 120°) in a circumferential direction around the first gear 51. At least one of the three pinion gears 53 is partially or entirely located in the storage portion 44 described above, and functions as a rotating body that splashes the lubricating oil stored in the storage portion 44 with the rotation caused by the driving of the electric motor 2. In the example illustrated in FIG. 2, the lowermost pinion gear 53 disposed immediately below the first gear 51 functions as a rotating body for splashing the lubricating oil, and thus the splashed lubricating oil is supplied to two upper pinion gears 53. Here, assuming that the pinion gear 53 rotates in the counterclockwise direction in FIG. 2, the lubricating oil splashed by the rotation of the lowermost pinion gear 53 is mainly supplied to the pinion gear located at an upper left, and then the lubricating oil scattered by the rotation of the pinion gear located at the upper left is mainly further supplied to the pinion gear located at an upper right.

In the second gear 52, a gear portion 52a is an internal gear and meshes with the small diameter gear 53b of the pinion gear 53. The second gear 52 includes a connecting portion 52b extending from the gear portion 52a toward the differential gear system 6 across the outer peripheral side of the pinion holder 54 (pinion gear supporting portion 54a), and the connecting portion 52b is mechanically connected to the differential gear casing 61 of the differential gear system 6 through a connecting unit such as a spline. In other words, the second gear 52 includes a second-gear large diameter portion 52c constituting the connecting portion 52b with the differential gear casing 61, a second-gear small diameter portion 52d constituting the gear portion 52a meshing with the pinion gear 53, and a second gear connecting portion 52e for connecting the second-gear large diameter portion 52c and the second-gear small diameter portion 52d, and an outer diameter of the second-gear small diameter portion 52d is smaller than that of the second-gear large diameter portion 52c, Further, the second gear 52 has a lower end located in the storage portion 44 described above, and also functions as a rotating body for splashing the lubricating oil stored in the storage portion 44 with the rotation caused by the driving of the electric motor 2.

Figure 3:
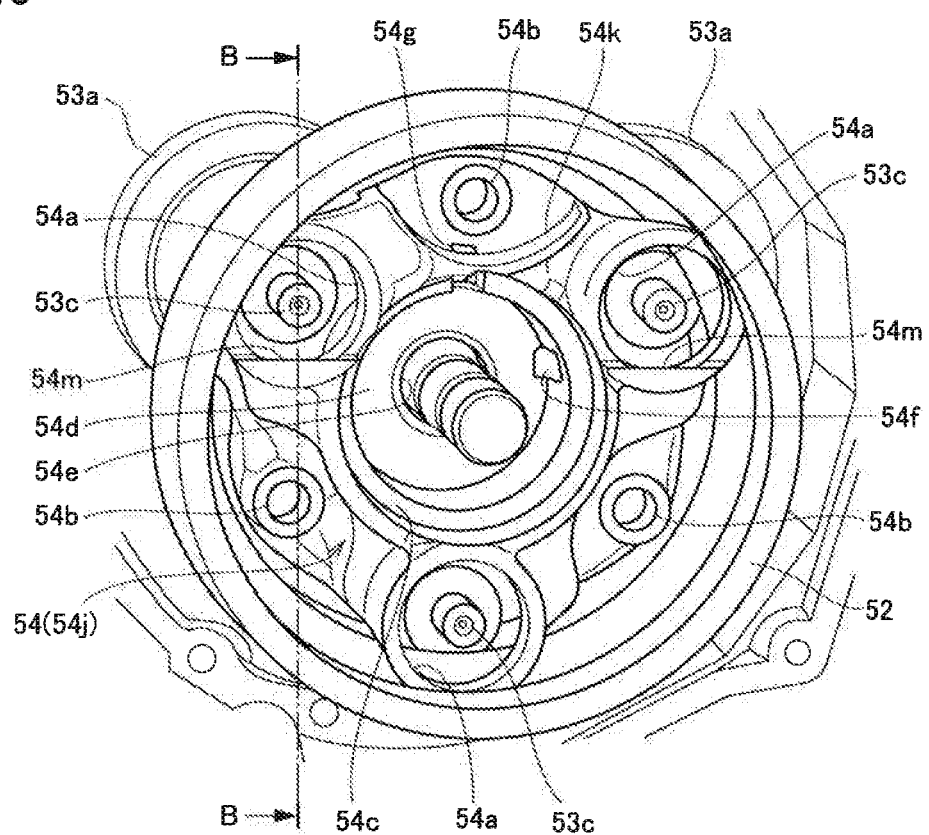
FIG. 3 is a perspective view of the pinion gear, a second gear, and a pinion holder (bearing is not illustrated) when viewed from the differential gear system side.
Figure 4:
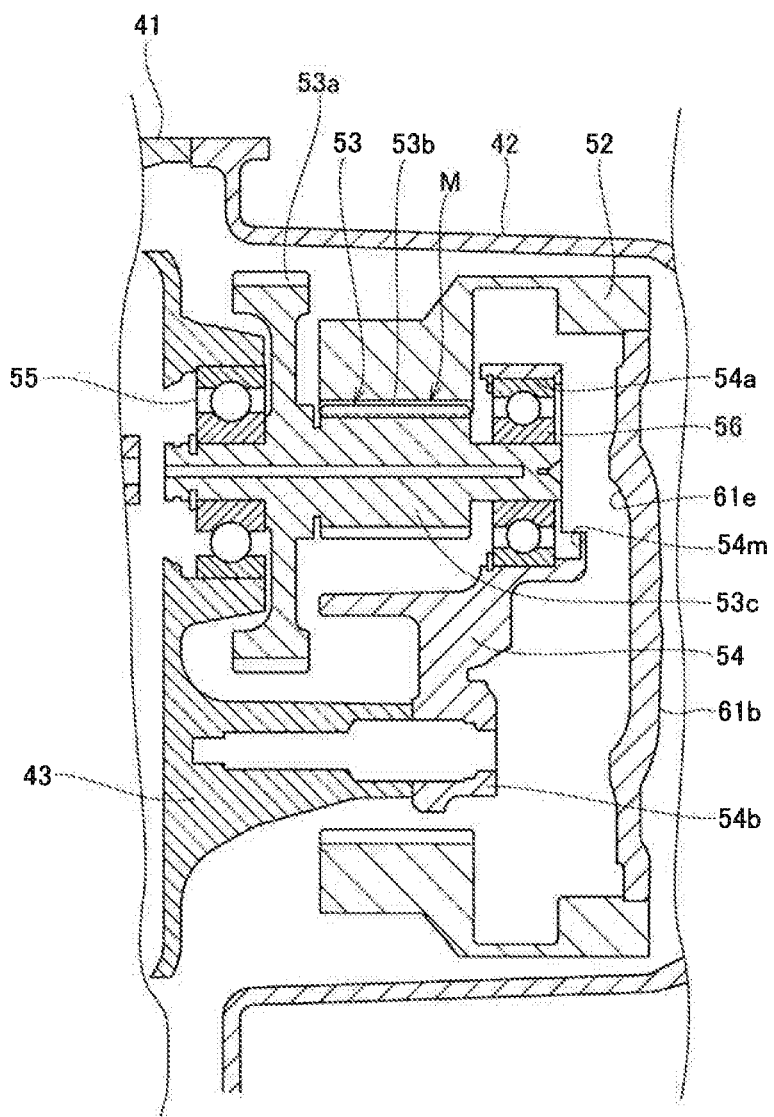
FIG. 4 is a sectional view taken along line B-B in FIG. 3.
Figure 5:
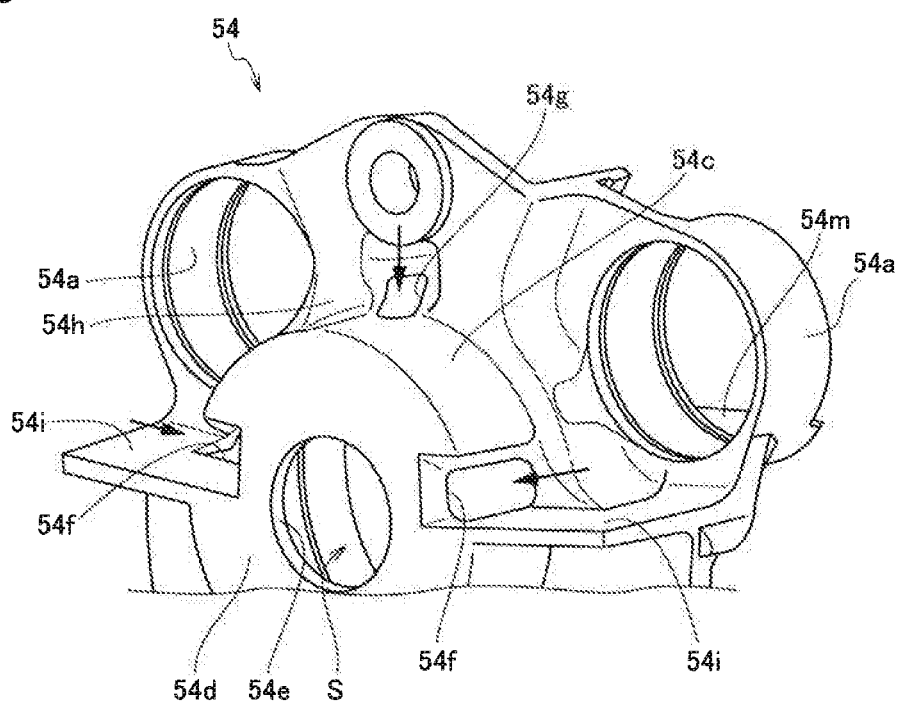
FIG. 5 is a perspective view of a main part of the pinion holder when viewed from the pinion gear side.
Figure 6:
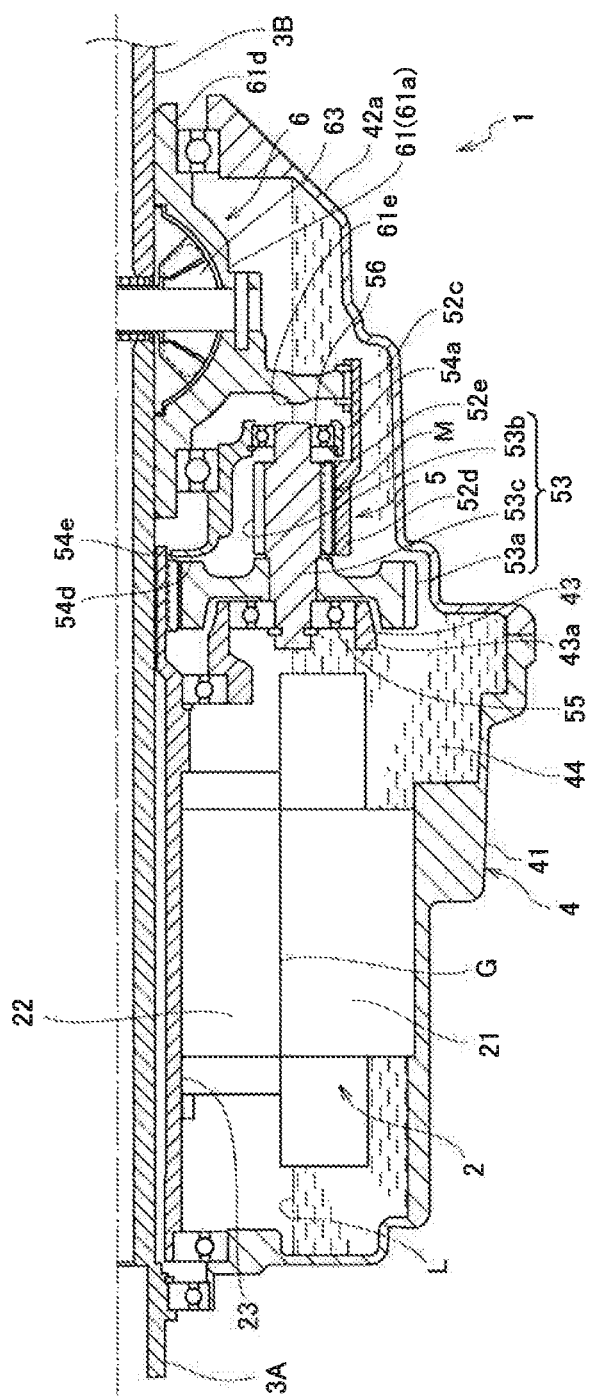
FIG. 6 is a partial sectional view of the power system illustrated in FIG. 1, and is a sectional view taken along line C-C in FIG. 2.

As illustrated in FIGS. 3 to 5, the pinion holder 54 includes three pinion gear supporting portions 54a each of which rotatably supports the pinion shaft 53c of the pinion gear 53 through the bearing 56, three fixed portions 54b that are fixed to the partition wall 43, and a bottomed cylindrical cup portion 54c formed on a center (on an inner diameter side of the pinion gear supporting portion 54a and the fixed portion 54b) of the pinion holder 54.

The pinion gear supporting portion 54a is disposed on the side of the differential gear casing 61 of the differential gear system 6 relative to a meshing portion M between the second gear 52 mechanically connected to the differential gear casing 61 of the differential gear system 6 and the small diameter gear 53b of the pinion gear 53. Thus, the other end of the pinion shaft 53c, in which one end thereof is supported by the partition wall 43 through the bearing 55, is supported by the pinion gear supporting portion 54a through the bearing 56, and thus the pinion gear 53 can be appropriately supported in a state of being held at both sides.

The three fixed portions 54b are located at intermediate portions between the pinion gear supporting portions 54a adjacent to each other in the circumferential direction, and are fastened to the partition wall 43 with bolts 57, respectively. Thereby, the partition wall 43 serves as a support member of the pinion holder 54 as well as a support member of the pinion shaft 53c.

The cup portion 54c surrounds the outer periphery of one axle 3A through a space portion S from one end side to the other end side of the meshing portion M in the axial direction and on the inner peripheral side of the meshing portion M in the radial direction, and the bottom 54d on one end side is provided with a through-hole 54e through which the axle 3A penetrates. In addition, the inner peripheral part on the other end side of the cup portion 54c rotatably supports one end side of the differential gear casing 61 through the bearing 65. Thereby, the pinion holder 54 serves as a support member of the differential gear casing 61 as well as a support member of the pinion gear 53.

Differential Gear System

The differential gear system 6 includes the differential gear casing 61, a differential pinion shaft 62, a differential pinion gear 63, and left and right side gears 64A and 64B so as to allow difference in rotation of the left and right axles 3A and 3B while distributing the driving rotation, which is input to the differential gear casing 61 from the second gear 52, to the left and right axles 3A and 3B.

The differential gear casing 61 includes a spherical differential gear casing body 61a that accommodates the differential pinion shaft 62, the differential pinion gear 63, and the left and right side gears 64A and 64B, an input plate 61b that extends in the radial direction from the outer periphery of the differential gear casing body 61a and is mechanically connected to the second gear 52, and left and right extension portions 61c and 61d that extend in the axial direction from both sides of the differential gear casing body 61a. One extension portion 61c rotatably supports the one axle 3A at an inner peripheral part thereof, and an outer peripheral part thereof is rotatably supported by the pinion holder 54 through the bearing 65. Further, the other extension portion 61d rotatably supports the other axle 3B at an inner peripheral part thereof, and an outer peripheral part thereof is rotatably supported by the end wall 42a of the second casing 42 through the bearing 66.

The differential pinion shaft 62 is supported by the differential gear casing body 61a so as to be directed in a direction orthogonal to the axles 3A and 3B, and rotatably supports two differential pinion gears 63, which are bevel gears, inside the differential gear casing body 61a. That is, the differential pinion shaft 62 allows the differential pinion gears 63 to rotate while revolving with the rotation of the differential gear casing 61.

The left and right side gears 64A and 64B are bevel gears, are rotatably supported inside the differential gear casing body 61a so as to mesh with the differential pinion gears 63 from both sides, and are mechanically connected to the left and right axels 3A and 3B through the connecting unit such as the spline. In a state where the differential pinion gears 63 revolve without rotating, for example, during straight running, the left and right side gears 64A and 64B rotate at a constant speed, and the driving rotation is transmitted to the left and right axles 3A and 3B. Furthermore, during curve running or left or right turning, the differential pinion gears 63 rotate, so that the left and right side gears 64A and 64B rotate relative to each other and the difference in rotation between the left and right axles 3A and 3B is allowed.

Lubrication Function of Pinion Holder

Next, a lubrication function of the pinion holder 54 will be described.

The pinion holder 54 has a storage space to store lubricating oil splashed from the storage portion 44 of the housing 4 by the second gear 52 or the pinion gear 53. The storage space is the above-described space portion S formed by the cup portion 54c and the one axle 3A, and the lubricating oil splashed by the second gear 52 or the pinion gear 53 flows into the space portion S through communication holes 54f and 54g (which will be described below) communicating with the space portion S.

The lubricating oil flowing into the space portion S is supplied to the above-described bearing 65 which is disposed adjacent to the space portion S for rotatably supporting one end side of the differential gear casing 61, whereby the bearing 65 is properly lubricated. In addition, the lubricating oil is also distributed from the space portion S to the inside of the differential gear system 6 requiring lubrication and the electric motor 2 that needs to be cooled by the lubricating oil. More specifically, the lubricating oil is supplied from the space portion S through the clearance between the axle 3A and the extension portion 61c of the differential gear casing 61 to the inside of the differential gear system 6, and is supplied from the space portion S to the electric motor 2 through the clearance between the axle 3A and the rotor shaft 23.

As illustrated in FIG. 5, the pinion holder 54 includes first guide portions 54i for receiving the lubricating oil, which is splashed by the second gear 52 or the pinion gear 53, on a first face 54h opposed to the pinion gear 53. The first guide portions 54i are protrusions that are formed on both sides of the cup portion 54c and extend linearly toward the cup portion 54c, and guide the received lubricating oil to the cup portion 54c. The communication hole 54f is formed in a connecting portion between the first guide portion 54i and the cup portion 54c, so that the lubricating oil received by the first guide portion 54i is stored in the space portion S through the communication hole 54f.

As illustrated in FIG. 3, the pinion holder 54 includes a second guide portion 54k for receiving the lubricating oil, which is splashed by the second gear 52 or the pinion gear 53, on a second face 54j opposed to the differential gear casing 61 of the differential gear system 6. The second guide portion 54k is a protrusion that is formed above the cup portion 54c and extends in an arc shape below the uppermost fixed portion 54b, and guides the received lubricating oil to the cup portion 54c. The communication hole 54g is formed in a connecting portion between the second guide portion 54k and the cup portion 54c, so that the lubricating oil received by the second guide portion 54k is stored in the space portion S through the communication hole 54g. The communication hole 54g also communicates with the first face 54h of the pinion holder 54.

As illustrated in FIGS. 3 and 4, among the pinion gear supporting portions 54a of the pinion holder 54, the pinion gear supporting portions 54a supporting the two upper pinion gears 53 respectively include pockets 54m that store the lubricating oil at an opening end on the side of the second face 54j opposed to the differential gear casing 61 of the differential gear system 6. The pocket 54m temporality holds the lubricating oil supplied to the pinion gear supporting portion 54a, thereby enabling proper lubrication of the bearing 56.

By the way, some of the lubricating oil supplied from e space portion S to the bearing 65 flows to the outer periphery of the differential gear casing 61 by passing through the bearing 65, and receives a centrifugal force caused by the rotation of the differential gear casing 61 and moves radially outward along the input plate 61b. The input plate 61b of the embodiment includes a third guide portion 61e that guides the lubricating oil moving radially outward along the input plate 61b to the two upper pinion gear supporting portions 54a. The third guide portion 61e is an edge of an annular recess formed on a surface of the input plate 61b opposed to the pinion gear 53, and the lubricating oil moving radially outward along the input plate 61b is guided to the pinion gear supporting portion 54a by the edge formed in a position opposed to the pinion gear supporting portion 54a in the radial direction. Some of the lubricating oil splashed by the second gear 52 also flows in the same manner.

As described above, according to the embodiment, since the pinion holder 54 has the pinion gear supporting portion 54a, which is disposed on the side of the differential gear casing 61 of the differential gear system 6 to support the pinion gear 53, relative to the meshing portion M between the second gear 52 mechanically connected to the differential gear casing 61 of the differential gear system 6 and the pinion gear 53, the pinion gear 53 can be appropriately supported. This enables appropriate power transmission from the pinion gear 53 to the second gear 52.

In addition, since the pinion holder 54 for supporting the other end of the pinion shaft 53c is fixed to the partition wall 43 for supporting one end of the pinion shaft 53c, the partition wall 43 has both the support function of the pinion shaft 53c and the support function of the pinion holder 54, so that the components can be used in common and thus the number of components can be reduced.

Further, since the pinion gear 53 has the large diameter gear 53a and the small diameter gear 53b and the small diameter gear 53b meshes with the second gear 52, enlargement in dimension in the radial direction can be prevented.

Further, since the pinion holder 54 has the space portion S for storing the lubricating oil splashed by the rotating body, the splashed lubricating oil is supplied to the portion requiring lubrication through the space portion S of the pinion holder 54, and thus the necessary portion can be lubricated even when there is no oil pump.

In addition, since the second gear 52 also serves as the rotating body for splashing the lubricating oil stored in the storage portion 44, the number of components can be reduced.

Further, since the pinion gear 53 also serves as the rotating body for splashing the lubricating oil stored in the storage portion 44, the number of components can be reduced.

Further, since the pinion holder 54 has the communication holes 54f and 54g communicating with the space portion S formed by the cup portion 54c and one axle 3A, it is possible to guide the lubricating oil scattered on the pinion holder 54 to the space portion S.

In addition, since the bearing 65 for rotatably supporting the differential gear casing 61 of the differential gear system 6 is disposed in the space portion S of the pinion holder 54, the bearing 65 can be lubricated with the lubricating oil stored in the space portion S.

Further, the lubricating oil splashed by the second gear 52 or the pinion gear 53 can be guided from the first guide portion 54i to the space portion S through the communication hole 54f.

Further, the lubricating oil splashed by the second gear 52 or the pinion gear 53 can be guided from the second guide portion 54k to the space portion S through the communication hole 54g.

In addition, the lubricating oil is guided from the space portion S to the pinion gear supporting portion 54a through the third guide portion 61e of the differential gear casing 61, and thus the bearing 56 disposed on the pinion gear supporting portion 54a can be lubricated.

Further, the pocket 54m temporality holds the lubricating oil supplied to the pinion gear supporting portion 54a, and thus the bearing 56 disposed on the pinion gear supporting portion 54a can be more properly lubricated.

It is noted that the invention is not limited to the above-described embodiment, but can be appropriately modified and improved, and the like.

For example, the pinion holder 54 can select any shape as long as it has the pinion gear supporting portion 54a disposed on the side of the differential gear casing 61 of the differential gear system 6, relative to the meshing portion M between the second gear 52 and the pinion gear 53.

In addition, the number of pinion gears 53 is not limited to three, but may be one, two, or four or more.

The power system 1 may adopt a forced lubrication system instead of or together with the splashing type lubrication system.

The invention claimed is:

1. A power system comprising:
an electric motor that drives a left wheel and a right wheel of a vehicle;
a transmission that is disposed on power transmission paths between the electric motor and the left wheel and between the electric motor and the right wheel; and
a differential gear system that distributes output power shifted by the transmission to the left wheel and the right wheel, wherein
the transmission comprises:
a first gear that is mechanically connected to the electric motor;
a second gear that has a rotation axis in common with the first gear and is mechanically connected to a differential gear casing of the differential gear system;
a pinion gear that meshes with the first gear and the second gear; and
a pinion holder that rotatably supports the pinion gear,
the pinion holder has a pinion gear supporting portion which is disposed on a side of the differential gear casing of the differential gear system to support the pinion gear, relative to a meshing portion between the second gear and the pinion gear,
a first end portion of the pinion gear is supported by a partition wall, and a second end portion of the pinion gear which is opposite to the first end portion is supported by the pinion gear supporting portion of the pinion holder, across the meshing portion, and
the second gear comprises:
a connecting portion which is connected to the differential gear casing of the differential gear system on a first side of the pinion gear supporting portion; and
a gear portion which meshes with the pinion gear on a second side of the pinion gear supporting portion which is opposite to the first side.

2. The power system according to claim 1, wherein the pinion gear is configured such that one end of a pinion shaft is rotatably supported on a portion of the partition wall through a first bearing and an other end thereof is rotatably supported on the pinion gear supporting portion of the pinion holder through a second bearing, and the pinion holder is fixed to the partition wall portion.

3. The power system according to claim 1, wherein the pinion gear comprises a large diameter gear and a small diameter gear, and
the small diameter gear meshes with the second gear.

4. The power system according to claim 1, wherein
the power system comprises a housing that accommodates the electric motor, the transmission, and the differential gear system,
the housing has a storage portion that stores a liquid medium, and
the pinion holder has a storage space that stores the liquid medium splashed by a rotating body.

5. The power system according to claim 4, wherein
the rotating body is the second gear.

6. The power system according to claim 4, wherein
the power system comprises a plurality of the pinion gears, and
the rotating body is at least one of the plurality of pinion gears.

7. The power system according to claim 4, wherein
the pinion holder has a cup portion that is formed with a through-hole, through which one axle of a left axle and a right axle penetrates, on a bottom,
the storage space is a space portion that is formed by the cup portion and the one axle, and
the pinion holder has a communication portion communicating with the space portion.

8. The power system according to claim 7, wherein
the differential gear casing of the differential gear system is rotatably supported on the cup portion of the pinion holder through a third bearing, and
the third bearing is disposed in the space portion.

9. The power system according to claim 7, wherein
the pinion holder has a first guide portion on a first face opposed to the pinion gear to receive the liquid medium, and
the communication portion is formed in the connecting portion between the first guide portion and the cup portion.

10. The power system according to claim 7, wherein
the pinion holder has a second guide portion on a second face opposed to the differential gear casing of the differential gear system to receive the liquid medium, and
the communication portion is formed in a connecting portion between the second guide portion and the cup portion.

11. The power system according to claim 4, wherein
the differential gear casing of the differential gear system has an input plate that extends in a radial direction and is mechanically connected to the second gear, and
the input plate has a third guide portion that guides the liquid medium supplied from the storage space to the pinion gear supporting portion of the pinion holder.

12. The power system according to claim 11, wherein
the pinion gear supporting portion of the pinion holder has a pocket that stores the liquid medium.

* * * * *